United States Patent
Xiong et al.

(10) Patent No.: US 11,670,078 B2
(45) Date of Patent: Jun. 6, 2023

(54) METHOD AND SYSTEM FOR VISUAL BASED INSPECTION OF ROTATING OBJECTS

(71) Applicant: AGENCY FOR SCIENCE, TECHNOLOGY AND RESEARCH, Singapore (SG)

(72) Inventors: Wei Xiong, Singapore (SG); Wenyu Chen, Singapore (SG); Jierong Cheng, Singapore (SG); Jia Du, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 66 days.

(21) Appl. No.: 17/598,800

(22) PCT Filed: Mar. 27, 2020

(86) PCT No.: PCT/SG2020/050182
§ 371 (c)(1),
(2) Date: Sep. 27, 2021

(87) PCT Pub. No.: WO2020/197508
PCT Pub. Date: Oct. 1, 2020

(65) Prior Publication Data
US 2022/0189044 A1    Jun. 16, 2022

(30) Foreign Application Priority Data
Mar. 28, 2019    (SG) ............................ 10201902782Q

(51) Int. Cl.
*G06V 20/00*    (2022.01)
*G06T 7/277*    (2017.01)
(Continued)

(52) U.S. Cl.
CPC ............ *G06V 20/00* (2022.01); *G06F 18/295* (2023.01); *G06T 7/277* (2017.01); *G06V 10/32* (2022.01);
(Continued)

(58) Field of Classification Search
None
See application file for complete search history.

(56) References Cited

U.S. PATENT DOCUMENTS

| 8,477,998 B1 | 7/2013 | Kim et al. |
| 2004/0037467 A1* | 2/2004 | Wenzel ................ G06V 10/752 382/203 |

(Continued)

FOREIGN PATENT DOCUMENTS

| WO | WO 2020197508 A1 | 10/2020 |

OTHER PUBLICATIONS

International Search Report and Written Opinion, International Application No. PCT/SG2020/050182, dated Sep. 1, 2020.

*Primary Examiner* — Vikkram Bali
(74) *Attorney, Agent, or Firm* — George S. Blasiak; Heslin Rothernberg Farley & Mesiti, P.C.

(57) ABSTRACT

This disclosure relates to method and system for visual inspection of rotating components. The method includes representing rotation cycles of a rotating component as spatial features based on video or image frames, ascertaining and/or evolving Hidden Markov Model (HMM) chains for the cycles, ascertaining a count of the rotating component in the frames and/or labelling the frames with ascertained states of the HMM chains.

18 Claims, 5 Drawing Sheets

(51) Int. Cl.
*G06F 18/20* (2023.01)
*G06V 10/44* (2022.01)
*G06V 10/32* (2022.01)

(52) U.S. Cl.
CPC .. *G06V 10/457* (2022.01); *G06T 2207/10016* (2013.01)

(56) References Cited

U.S. PATENT DOCUMENTS

| | | |
|---|---|---|
| 2007/0090961 A1* | 4/2007 | Gerez ............... G01P 3/489 340/670 |
| 2014/0313345 A1 | 10/2014 | Conrad et al. |
| 2017/0161563 A1 | 6/2017 | Cetin et al. |
| 2017/0235475 A1 | 8/2017 | Heim |
| 2018/0158183 A1* | 6/2018 | Kobayashi ............ G01N 21/84 |

* cited by examiner

METHOD AND SYSTEM FOR VISUAL BASED INSPECTION OF ROTATING OBJECTS

CROSS REFERENCE TO RELATED APPLICATIONS

This application is a National Stage application under 35 U.S.C. § 371 of PCT Application No. PCT/SG2020/050182, filed Mar. 27, 2020, and published on Oct. 1, 2020 as WO 2020/197508, entitled "METHOD AND SYSTEM FOR VISUAL BASED INSPECTION OF ROTATING OBJECTS", which claims priority to Singapore Application No. 10201902782Q, filed Mar. 28, 2019, entitled "A VISUAL BASED METHOD FOR COUNTING AND TRACKING BLADES OF A TURBINE ENGINE". The entire contents of WO 2020/197508 is hereby incorporated by reference herein in its entirety.

TECHNICAL FIELD

This disclosure generally relates to visual based inspection of objects including rotational components such as rotating blades in aircraft engine, wind turbine, or water turbines, and real-time objects on conveying belt. In particular, the visual inspection may involve object counting, object labelling, defect detection and/or defect localisation in object.

BACKGROUND

During inspection of an internal structure of an aircraft jet engine for cracks or fatigue, small openings leading to an exterior allow a borescope to be snaked into the engine without having to drop the engine from the aircraft. In such an inspection, it is often difficult for an inspector to know the exact borescope tip location within the engine, thus making it difficult to identify the location of new cracks found or to return to previously identified trouble spots. When a crack is found on a blade of the turbine engine, the inspector must measure the length and width of the crack, which is problematic if the borescope's pose is unknown. Therefore, automatic blade counting tool to assist a human inspector in defect localization by counting and labelling each blade in a video clip or stream is desirable.

There are several challenges for automatic blade counting methods due to complex industrial situations:
1) Reliable visual cue/feature is lacking due to near-textureless smooth surface of engine parts and self-similarity between blades, limited field of view where only a small fraction of complete object appears in a single image, instability of visual appearance under varying illumination due to moving light source, and strong reflection and spurious edge/boundary due to glaring spot or shallow on surface.
2) Random manual rotation: Fast rotation may result in capturing only a few frames for each cycle and may also cause motion blurring, as the operator rotates the blade back and forth during inspection.
3) Subtle tip movement: The pose of borescope tip can be adjusted by navigating the main fiber and pulling the strings in the fiber for orientation. However, due to loosen strings, subtle hand shaking or mechanical vibration, it is challenging to ensure the tip will be fixed in the exact same pose throughout the blade rotation. As a result, the blade appearance in a periodic video can gradually drift during inspection.

SUMMARY

According to a first aspect of the disclosure, a method for visual inspection of a plurality of rotating components comprises:
  based on an initial subset of a plurality of observed image frames, which represents an initial rotation cycle of a rotating component, ascertaining an initial closed curve as spatial feature to represent the initial rotation cycle;
  ascertaining an initial Hidden Markov Model (HMM) chain, including a plurality of initial states located on equal curve length of the initial closed curve, for the initial set of the frames;
  for each subsequent subset of the frames, which represents each subsequent rotation cycle of the rotating component, ascertaining a subsequent HMM chain, including a plurality of subsequent states located on equal curve length of a subsequent closed curve as spatial feature, which represents the subsequent rotation cycle of the rotating component; and
  based on the initial HMM chain and the subsequent HMM chain of each subsequent subset of the frames, ascertaining a count of the rotating component in the frames, and/or labelling the frames with the initial states or the subsequent states.

In one embodiment of the first aspect, the method further comprises:
  obtaining the observed image frames from video data, by performing down-sampling, Gaussian smoothing, and principal component analysis on the video data.

In one embodiment of the first aspect, the step of ascertaining the initial closed curve as spatial feature to represent the initial rotation cycle includes
  performing curve-fitting of a plurality of data points representing the initial subset of the frames; and
  sampling the initial states based on locations of the data points at equal curve length on the initial closed curve.

In one embodiment of the first aspect, the step of ascertaining the initial Hidden Markov Model (HMM) chain including the plurality of initial states located on equal curve length of the initial closed curve includes
  ascertaining, for each of the initial states, a mean vector, a covariance matrix and a state transition matrix;
  based on the mean vector, the initial states, probabilities of each frame of the initial subset of frames belonging to an initial state, the covariance matrix and/or the state transition matrix, ascertaining a sequence of the initial states which has maximum likelihood in resulting in the initial subset of the frames; and
  assigning the sequence of the initial states to the initial subset of the frames.

In one embodiment of the first aspect, for each subsequent subset of the frames, which represent each subsequent rotation cycle of the rotating component, the step of ascertaining the subsequent HMM chain, including the plurality of subsequent states located on equal curve length of the second subsequent closed curve as spatial feature includes
  ascertaining, for each subsequent state, an optimal mean vector which maximises the likelihood of each frame of the subsequent subset of the frames;
  ascertaining, for each subsequent state, a difference between the optimal mean vector and the mean vector and smoothing the difference;
  ascertaining, for each subsequent state, an updated mean vector by summing the mean vector with the smoothed difference; and assigning the subsequent states to the subsequent subset of the frames.

In one embodiment of the first aspect, the step of ascertaining the subsequent states based on the updated mean vector of each of the subsequent subset of the frames includes performing curve-fitting of the subsequent states to obtain the subsequent closed curve;

sampling the subsequent states based on their locations on equal curve length of the subsequent closed curve; and based on a total length of the second closed curve, ascertaining, for each of the second states, an updated covariance matrix.

In one embodiment of the first aspect, the state transition matrix is based on Gaussian distribution.

In one embodiment of the first aspect, the step of ascertaining the count of the rotating component in the frames includes summing a shortest distance travelled from a selected state of the initial HMM chain to another state of the subsequent HMM chain and dividing the sum by a total number of states in the initial HMM chain or the subsequent HMM chain.

According to a second aspect of the disclosure, a system for visual inspection of a plurality of rotating components comprises:

a memory device storing a plurality of observed image frames;

a computing processor communicably coupled to the memory device and configured to:

based on an initial subset of the frames, which represents an initial rotation cycle of a rotating component, ascertain an initial closed curve as spatial features to represent the initial rotation cycle;

ascertain an initial Hidden Markov Model (HMM) chain, including a plurality of initial states located on equal curve length of the initial closed curve, for the initial set of the frames;

for each subsequent subset of the frames, which represent each subsequent rotation cycle of the rotating component, ascertain a subsequent HMM chain, including a plurality of subsequent states located on equal curve length of a subsequent closed curve in spatial feature space, which represents the subsequent rotation cycle of the rotating component; and based on the initial HMM chain and the subsequent HMM chain of each subsequent subset of the frames, ascertain a count of the rotating component in the frames, and/or labelling the frames with the initial states or the subsequent states.

In one embodiment of the second aspect, the system further comprises a display device communicably coupled to the computing processor, the display device configured to present the frames having labelled with the initial states or the subsequent states.

In one embodiment of the second aspect, the computing processor is further configured to:

ascertain the count of the rotating component in the frames by sum a shortest distance travelled by each state of the initial HMM chain and of the subsequent HMM chain and dividing the sum by a total number of states in the initial HMM chain and in the subsequent HMM chain.

DETAILED DESCRIPTION

Figure 1:
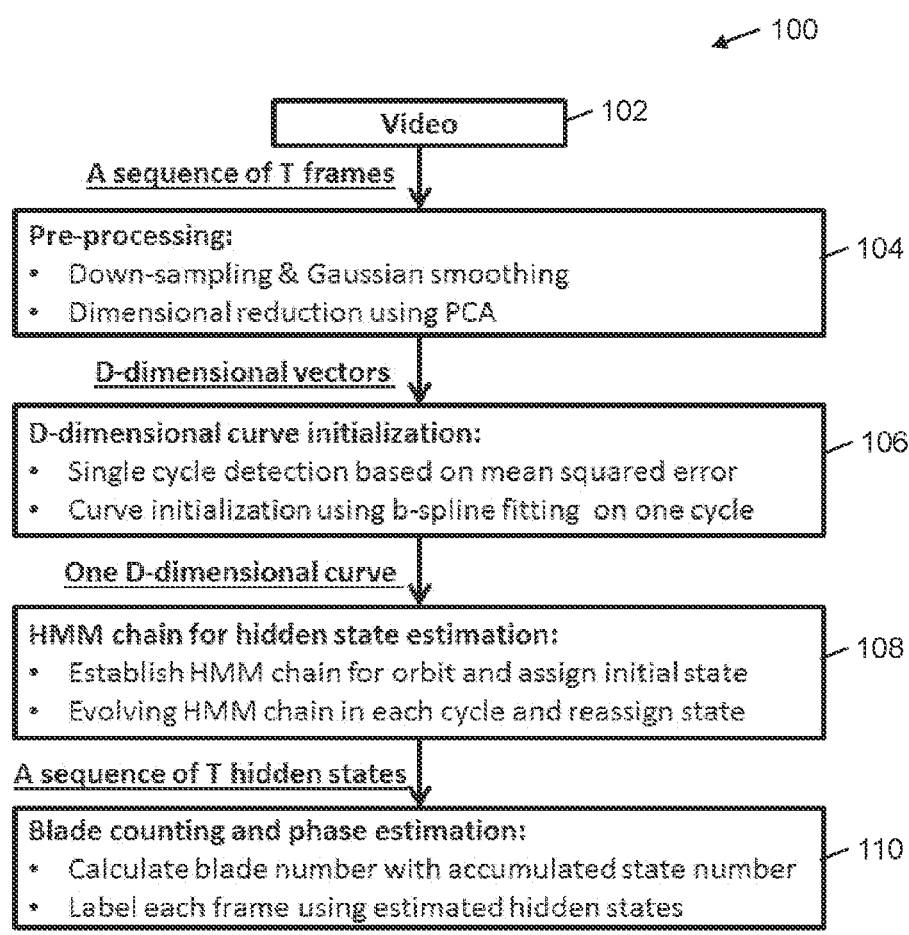
FIG. 1 shows a flow sequence for counting and/or tracking rotating objects according to some embodiments.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, including examples and claims, the articles "a", "an" and "the" as used with regard to a feature or element include a reference to one or more of the features or elements. The terms "comprising," "including," and "having" are intended to be open-ended and mean that there may be additional features or elements other than the listed ones. The term "and/or" includes any and all combinations of one or more of the associated listed items.

According to one aspect of the disclosure, a method for visual inspection of rotating components is provided. FIG. 1 shows a flow sequence 100 for counting and/or tracking rotating objects, e.g. blades, according to some embodiments.

In block 102, video data, e.g. video clip or stream, may be provided. The video data includes a sequence or plurality of observed image frames (or "frames"), e.g. periodic video, capturing one or more cycles of the blade rotation.

In block 104, the frames may be processed and transformed, e.g. by performing down sampling, Gaussian smoothing, and/or other operations. In some embodiments, this processing and transformation includes a dimension reduction method which uses principal component analysis (PCA) such that each frame can be represented as a high dimensional data point moving along a closed orbit during blade rotation. Eventually, this block outputs a feature vector which represents the key feature/content of each frame. Alternatively, the extraction of such feature vector can be achieved by hand-crafting or machine learning by using supervised or unsupervised methods.

In block 106, a single cycle of rotation of a blade (or other rotating object) may be detected from the frames. Particularly, a subset of the frames (or "initial subset of the frames") representing a rotation cycle (or "initial rotation cycle") of a blade may be detected. This initial cycle may be detected by identifying the nearest subsequent frame which results in a local minimum difference, e.g. mean square error, between that particular frame and a reference frame, e.g. first or earlier frame.

Figure 2A:
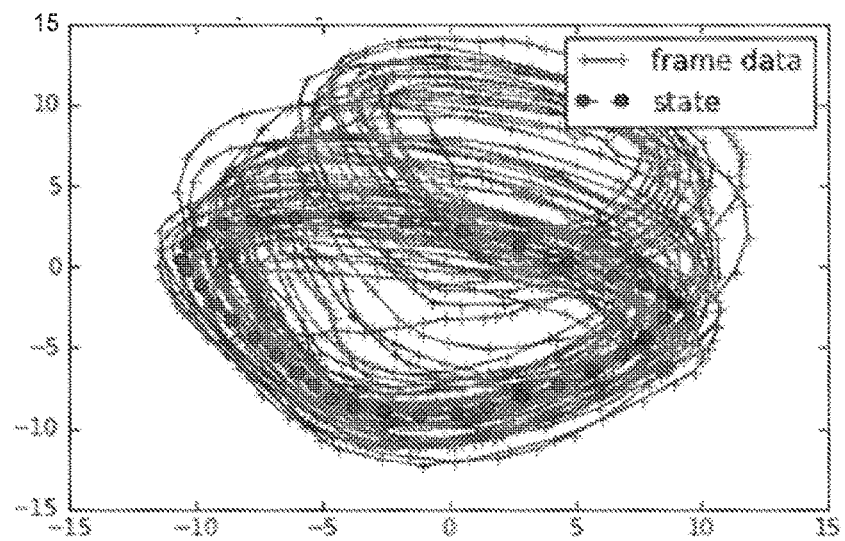
FIG. 2A shows frame data from all frames and initial states in two dimensions.
Figure 2B:
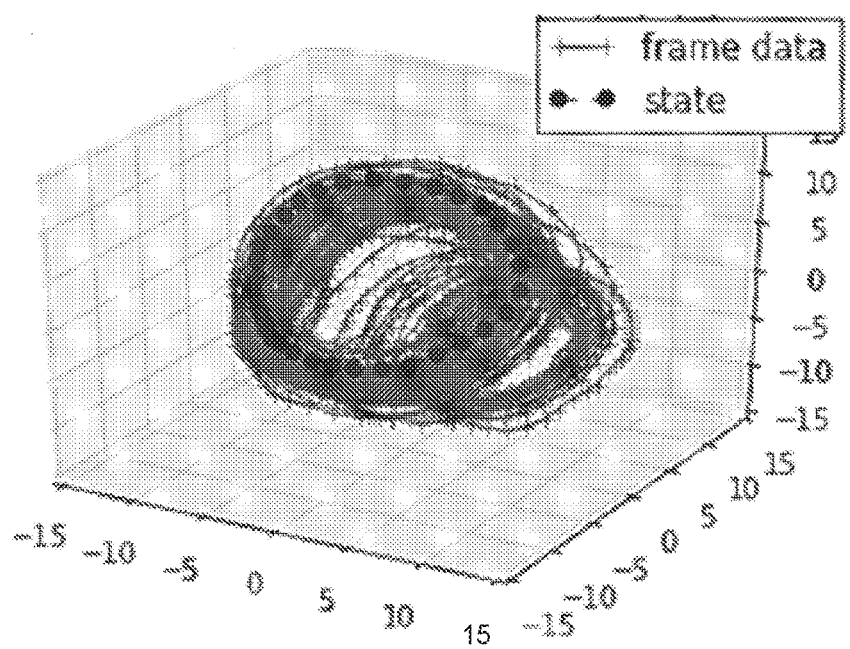
FIG. 2B shows frame data from all frames and initial states in three dimensions.

Based on the detected initial subset of the frames, a closed curve or orbit (or "initial closed curve") may be ascertained as spatial features to represent a time-stamped motion path of the initial rotation cycle of the blade in the initial subset of the frames. Here "spatial" features may refer to any features in the coordinate metric space, or in any other representation space, which are independent of time. The dimension of the features is normally high but can alternatively be low to represent the image frame. For example. FIGS. 2A and 2B represent these features in two-dimensions (2D) and three dimensions (3D), respectively, against time (hence frames). Accordingly, the initial closed curve represents an initial rotation cycle of the blade.

Block 106 may include performing curve-fitting, e.g. using basis spline (B spline) or other representation functions, to fit the curves, in which each data point would represent individual frames. This may also include sampling certain data points based on theft locations at equal and/or varying curve lengths on the dosed curve. These data points located at the equal curve length on the closed curve may be selected as grid points with each being treated as a state. Further, the initial closed curve may be used to infer the statuses of the subsequent points along the same motion path.

In block 106 or other blocks, one or more subsequent rotation cycles of the same blade may be detected from one or more subsets of the frames; for each of the subsequent rotation cycles, a respective closed curve may be ascertained, including any curve-fitting and/or sampling, as a spatial feature.

In block 108, an HMM chain (or "initial HMM chain") may be ascertained for the initial rotation cycle. This may include ascertaining parameters of the initial HMM chain to model the initial rotation cycle; and based on the ascertained parameters of the initial HMM chain, assigning states (or "initial states") to the initial subset of the frames which represents the initial rotation cycle.

Further in block 108, an evolved HMM chain (or "subsequent HMM chain") may be ascertained for a separate or subsequent rotation cycle of the same blade. This may include ascertaining parameters of the subsequent HMM chain; based on the ascertained parameters of the subsequent HMM chain, assigning states (or "subsequent states") to a subset of the frames (or "subsequent subset of the frames") which represents the subsequent rotation cycle.

Optionally, in addition, further evolved HMM chains may be ascertained for further additional rotation cycles in a similar manner as the preceding paragraph. Particularly, this may include, for each additional rotation cycle, ascertaining parameters of an additional HMM chain to model the additional cycle; based on the ascertained parameters, assigning states of the additional HMM chain to a subset of the frames which represents the additional rotation cycle.

In block 110, using the initial HMM chain and the subsequent HMM chain(s), number of blades may be ascertained, and/or each of the initial and the subsequent subset(s) of the frames may be labelled with the ascertained initial or evolved hidden states.

The above blocks will be further detailed in the following paragraphs.

Reference is now made to block 108 where an initial HMM chain may be ascertained for the initial rotation cycle.

In some embodiments, block 108 includes ascertaining parameters of the initial HMM chain to model the initial rotation cycle wherein the parameters include a mean vector, a covariance matrix and a state transition matrix. It may be assumed that the number of hidden states is N. Each state $s_i$ (where $i=1, \ldots, N$) may be modelled using a multivariate normal distribution with its mean vector, $\mu_i$, and its covariance matrix $\Sigma_i$, i.e. $\{\mu_i, \Sigma_i\}$ for $i=1, \ldots, N$. Dimension of $\mu_i$, is D which is the number of principal components from the PCA or the dimension of the representation feature space utilised here. Total length of the curve in this cycle is L. The mean vector of the i-th state, $i=1, \ldots, N$, may be initialised as $\mu_i=c_i$, where $c_i$ is the feature vector (in the same D-dimensional space) of the i-th node, $i=1, \ldots, N$, of the B-spline to represent the initial closed curve. Since the initial closed curve is re-parametrized by the states with equal curve length, the covariance matrix $\Sigma_i$ is initialized as uniform diagonal matrix $\sigma_x^2 1$ where $$\sigma_x^2 = \frac{1}{D}\left(\frac{L}{N}\right)^2$$

is a constant and 1 is the identity matrix. The state transition matrix $\Phi$ may follow a Gaussian distribution defined on the closed curve. Probability of transition from state $s_i$ to state $s_j$ can be estimated by $$\phi_{ij} = \frac{1}{\sqrt{2\pi\sigma_t^2}} \exp\left(-\frac{dist(i,j)^2}{2\sigma_t^2}\right)$$

where dist (i,j) is the shortest distance between state $s_i$ to state $s_j$ on the closed curve and $\sigma_t$ is the kernel size of the Gaussian distribution.

Figure 3A:
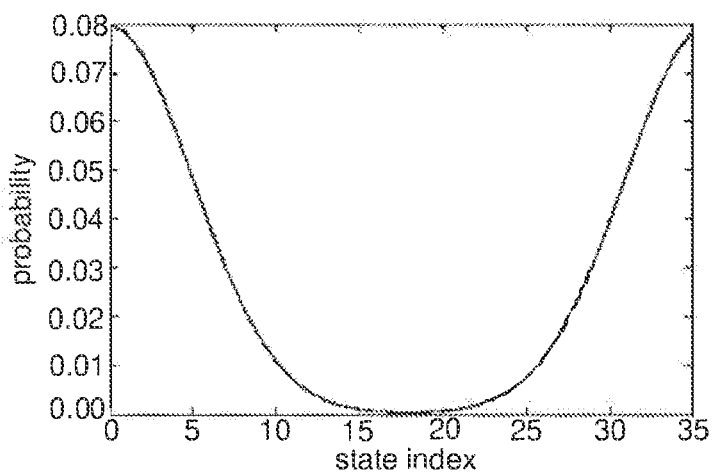
FIG. 3A shows a Gaussian kernel centred at zero on a closed curve according to one example.
Figure 3B:
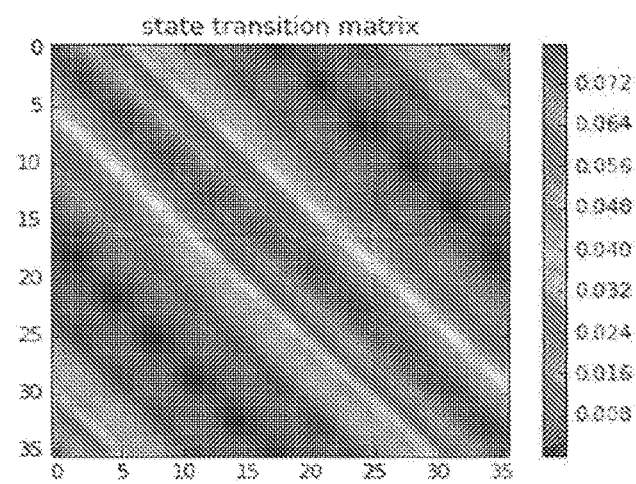
FIG. 3B shows a state transition matrix, according to one example.

FIG. 3A shows a Gaussian kernel centred at zero on a closed curve while FIG. 3B shows a state transition matrix, according to one example.

After ascertaining parameters of the initial HMM chain, including initial hidden states, these initial states may be assigned to the sequence of the initial subset of the frames which represents the initial rotation cycle. This assignment may be performed by applying the Viterbi algorithm, based on the initially ascertained mean vectors, the states, the probabilities of individual frames belonging to the states, the covariance matrixes and the state transition matrix, etc., to assign the hidden states to each frame in the video sequence. Accordingly, if a video has T number of frames, each frame will be assigned to a single state index based on the above initialisation. A description of the Viterbi algorithm is provided by Andrew J Viterbi, "*A personal history of the Viterbi algorithm,*" IEEE Signal Processing Magazine, vol. 23, no. 4, pp. 120-142, 2006, which is hereby incorporated by reference.

Figure 4:
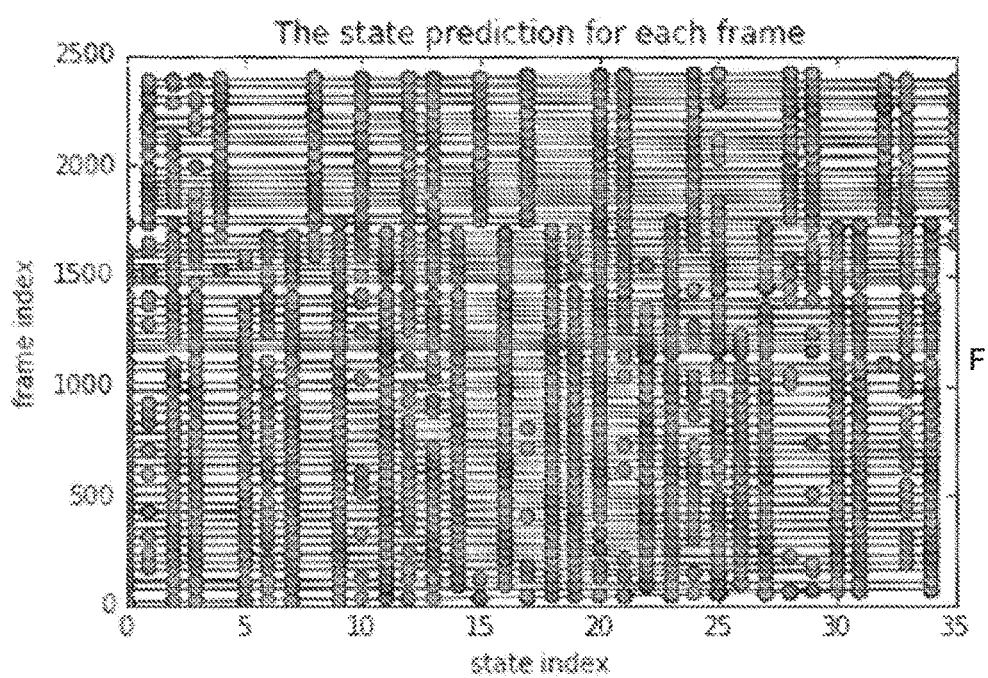
FIG. 4 shows state assignment for each frame, according to one example.

FIG. 4 shows state assignment for each frame, according to one example.

Reference is now made to block 108 where new cycles will be found and represented.

Block 108 may include curve-fitting the subsequent cycles e.g. by using B-spline or other functions, to provide a subsequent closed curve. The subsequent cycles are re-parametrized with say N nodes with equal curve length between them. Each node will be a state and a new HMM chain will be established to represent each subsequent cycle. An evolved or HMM chain (or "subsequent HMM chain") may be ascertained for a separate or subsequent rotation cycle of the blade. This ascertaining of an evolved HMM chain provides compensation for drifting orbit due to subtle tip movement.

In some embodiments, block 108 includes ascertaining parameters of the subsequent HMM chain, which includes ascertaining the state transition matrix $\Phi$, as well as the associated frame-to-state probabilities parameterized by $\{\mu_i, \Sigma_i\}$ for each state i, i=1, . . . , N. Applying the Expectation-Maximisation (EM) algorithm can result in an optimal mean vector $\mu_i^{max}$ which maximises likelihood of each frame of the subsequent rotation cycle is ascertained as $$\mu_l^{max} = \frac{\sum_{i=0}^{T} x_i p(l \mid x_i, \Theta)}{\sum_{i=0}^{T} p(l \mid x_i, \Theta)}$$

where l is the state index, $p(l|x_i, \Theta)$ is the likelihood that the observed frame $x_i$ belongs to state l under current HMM model parameter $\Theta$. A threshold $\Sigma_{i=0}^{T} p(l|x_i, \Theta) > \varepsilon$ is applied to eliminate updating of unlikely observed states and may be set as $\varepsilon=0.1$.

In some embodiments, the evolved or subsequent HMM chain is ascertained using a smoothness constraint to regulate the potential change, $\Delta\mu$, of the mean vector, to stabilize the evolution such that any deformation of the mean vector in the HMM chain can be represented by $$\Delta\mu^{smo} = \Delta\mu * G(0, \sigma_t)$$

where $G(0,\sigma_t)$ is Gaussian kernel centred at zero on a looping state chain as illustrated in FIG. 3A, $\Delta\mu$ is an arbitrary update of $\mu$ and as $\mu^{max}\|\mu^{old}$, where $\mu^{old}$ is the mean vector of states from last cycle, * is circular convolution. The updated mean vector (or mean vector of the subsequent HMM chain) may be ascertained by summing the previous mean vector, $\mu^{old}$ (e.g. mean vector in initial HMM chain) with a smoothed difference between the optimal mean vector and the mean vector, $\lambda(\mu^{max}-\mu^{old})*G(0,\sigma_t)$:

$$\mu^{new} = \mu^{old} + \lambda(\mu^{max}-\mu^{old}) * G(0,\sigma_t)$$

where $\lambda$ is scale of learning rate and may be set as 1. Alternative to using Gaussian kernel, averaging method may be used as smoothing constraint.

Based on the ascertained parameters of the subsequent HMM chain, e.g. at least the updated mean vector, states of the subsequent HMM (or "subsequent states") are assigned to a subset of the frames (or "subsequent subset of the frames") which represents the subsequent rotation cycle.

Figure 5A:
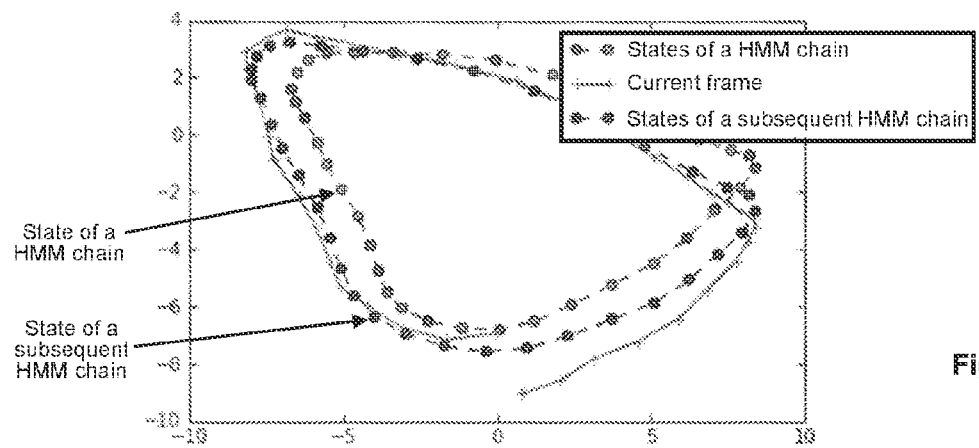
FIG. 5A shows states of an initial HMM chain, states of a subsequent (or evolved) HMM chain, and frame data of current frame (e.g. the subsequent set of the frames) in two dimensions.
Figure 5B:
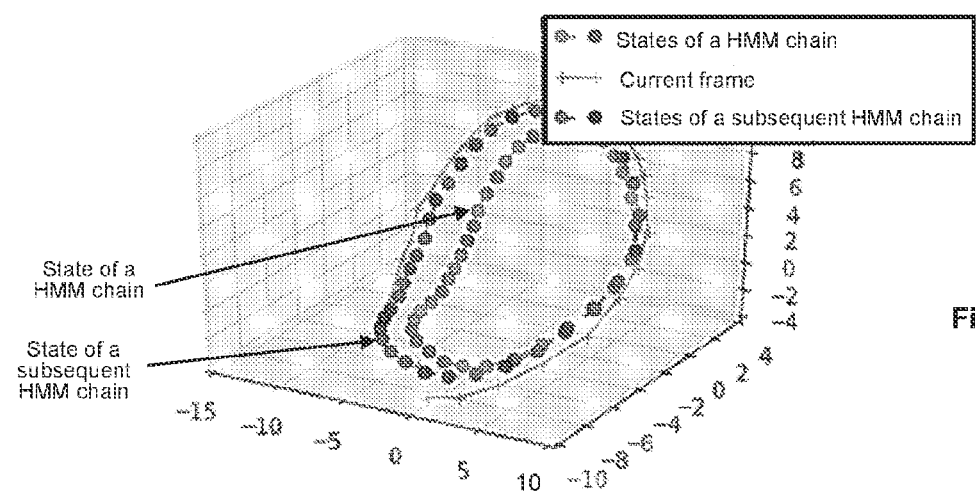
FIG. 5B shows states of an initial HMM chain, states of a subsequent (or evolved) HMM chain, and frame data of current frame (e.g. the subsequent set of the frames) in three dimensions.
Figure 5C:
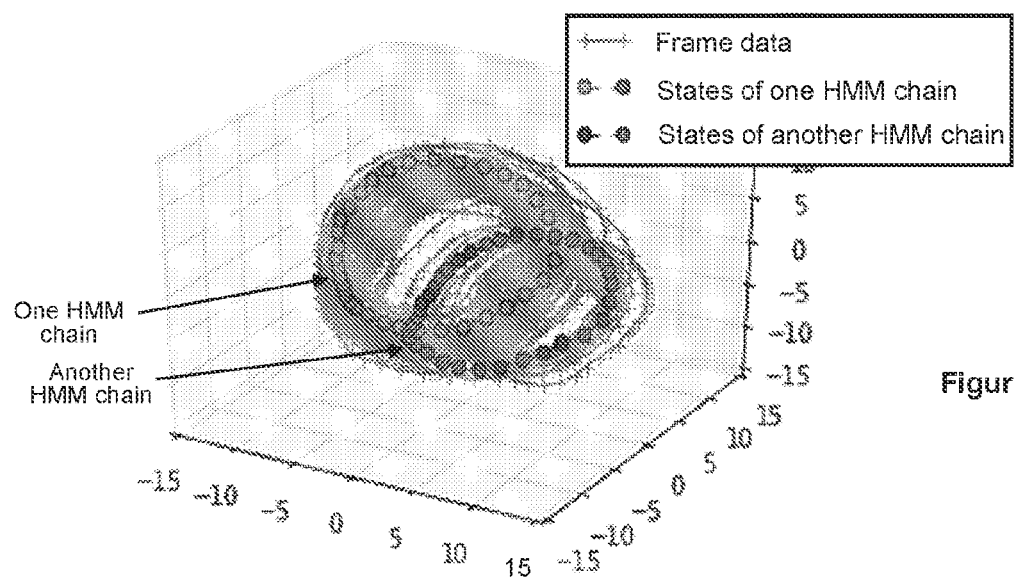
FIG. 5C shows states of one HMM chain, states of another HMM chain, and frame data of all frames in three dimensions.

FIG. 5A shows an initial HMM chain having initial states, a subsequent (or evolved) HMM chain having subsequent states, and frame data of current frame (e.g. the subsequent set of the frames) in two dimensions. FIG. 5B shows an initial HMM chain having initial states, a subsequent (or evolved) HMM chain having subsequent states, and frame data of current frame (e.g. the subsequent set of the frames) in three dimensions. FIG. 5C shows an initial HMM chain having initial states, a final HMM chain having final states, and frame data of all frames in three dimensions. In FIGS. 5A to 5C, the illustrated closed curves represent separate rotations of the same blade.

Reference is now made to block 110 where number of blades may be ascertained and/or each of the initial and the subsequent set of the frames may be labelled with the ascertained hidden state.

Figure 6:
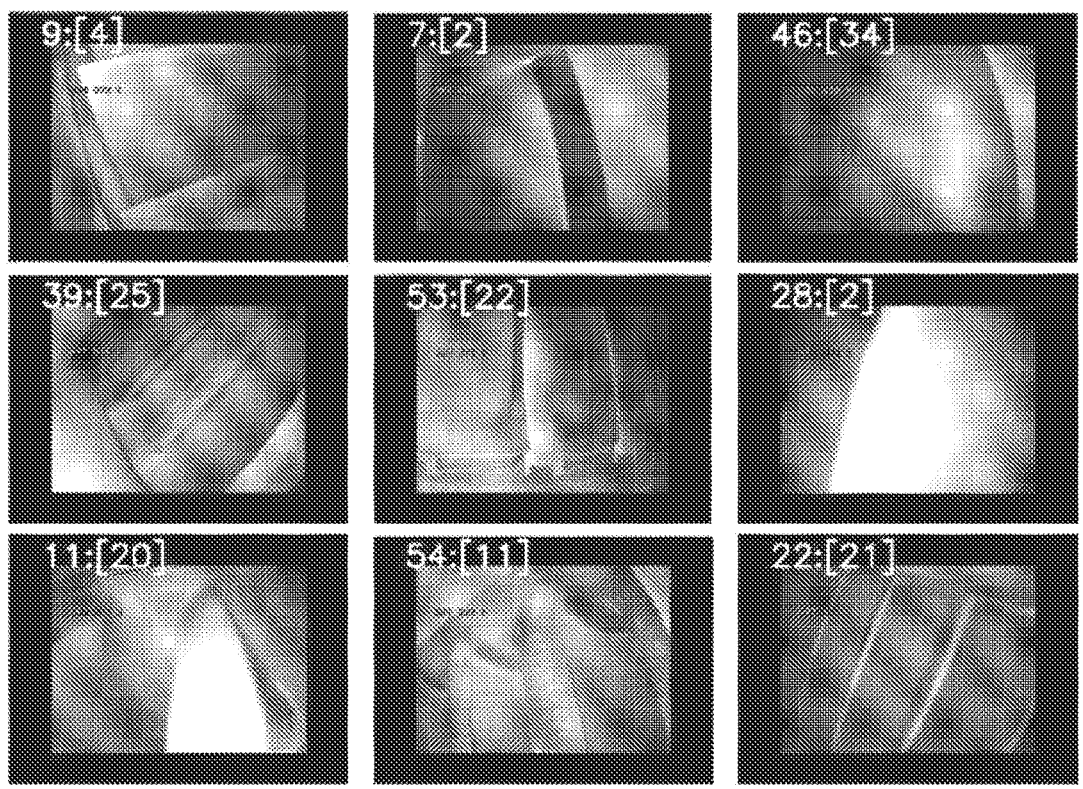
FIG. 6 shows examples of frames, each labelled with two count values: the count value outside a bracket is the number of rotating components (here being blades) that has passed so far since the first frame; the count value within a bracket is the number representing the index of the state of the current frame in the current HMM chain.

Evolving HMM chains from the initial set of the frames and the initial closed curve enables associations between an index (or identification) of the current blade and an index (or identification) of a current frame. This blade index may be required in practice, e.g. during inspection tasks, at least for identification or labelling of the blade. A set of frames may be labelled as shown in FIG. 6 wherein the unbracketed numbers represent a count or the number of times the same blade has passed through in previous frames within the set before the current frame while the bracketed numbers represent a phase or state index of the current frame.

Furthermore, based on at least some of the frames in the video, and the related HMM chains, a count or the total number of blades shown or appearing in some or all of the video frames may be ascertained. A count or the number of blades passing through so far in the video frames, starting from the first or reference frame to the current frame, may be ascertained by summing the shortest distance travelled along the path in each rotation cycle starting from a preselected state to another state which the current frame belongs to, over all the rotation cycles passed so far (e.g. from a selected state of the initial HMM chain to another state of the subsequent HMM chain(s)), and dividing this sum by a predefined total number of states in the initial or the subsequent HMMs (e.g. a count or the total number of states N defined above).

According to one aspect of the disclosure, a system for visual inspection of rotating components may be provided. The system comprises one or more computing processor(s), memory device(s), input device(s), output device(s), communication device(s), etc. The computing processor(s) may be in cooperation or communication coupling with: memory devices(s) for storing computer-executable instructions, video data, image frames, intermediate output and/or final output; a display device for presenting any ascertained outputs to an operator, and/or a communication device for transmitting any any ascertained outputs to an appropriate receiving device. Such outputs may refer to one or more of the following: the image frames obtained from block 102, processed data obtained from block 104, spatial features obtained from block 106, initial and/or evolved HMM chains obtained from block 108, computed blade count and/or labelled frames obtained from block 110. It is to be appreciated that in the above-described methods and in the flow sequence of FIG. 1, the various steps may be performed by the computing processor(s).

According to one aspect of the disclosure, a non-transitory computer-readable medium having computer-readable code executable by at least one computing processor is provided to perform the methods/steps as described in the foregoing.

Embodiments of the disclosure address the technical challenges for borescope inspection of aircraft jet engine with the following key features:

Feature-free video analysis independent from unreliable feature extraction such as corner or edge detection;

HMM chain as space-time representation for robust blade counting under random manual rotation;

Evolving HMM chain to compensate the drifting of orbit due to subtle tip movement of borescope imaging sensor.

Embodiments of the disclosure may also be employed for blade inspection in various aircraft engine, wind, or water turbines, and real-time object counting on conveying belt.

Embodiments of the disclosure may also be employed for automatic blade counting method to assist human inspector in defect localization by counting and labeling each rotor blade in the video.

Other embodiments will be apparent to those skilled in the art from consideration of the specification and practice of the disclosure. Furthermore, certain terminology has been used for the purposes of descriptive clarity, and not to limit the disclosed embodiments. The embodiments and features described above should be considered exemplary.

The invention claimed is:

1. A method for visual inspection of rotating components, the method comprising:
   based on an initial subset of a plurality of observed image frames, which represents an initial rotation cycle of a rotating component, ascertaining an initial closed curve as spatial feature to represent the initial rotation cycle;
   ascertaining an initial Hidden Markov Model (HMM) chain, including a plurality of initial states located on equal curve length of the initial closed curve, for the initial set of the frames;
   for each subsequent subset of the frames, which represents each subsequent rotation cycle of the rotating component, ascertaining a subsequent HMM chain, including a plurality of subsequent states located on equal curve length of a subsequent closed curve as spatial feature, which represents the subsequent rotation cycle of the rotating component; and
   based on the initial HMM chain and the subsequent HMM chain of each subsequent subset of the frames, ascertaining a count of the rotating component in the frames, and/or labelling the frames with the initial states or the subsequent states.

2. The method of claim 1, further comprising:
   obtaining the observed image frames from video data, by performing down-sampling, Gaussian smoothing, and principal component analysis on the video data.

3. The method of claim 1, wherein ascertaining the initial closed curve as spatial feature to represent the initial rotation cycle includes
   performing curve-fitting of a plurality of data points representing the initial subset of the frames; and
   sampling the initial states based on locations of the data points at equal curve length on the initial closed curve.

4. The method of claim 1, wherein ascertaining the initial HMM chain, including the plurality of initial states located on equal curve length of the initial closed curve, includes
   ascertaining, for each of the initial states, a mean vector, a covariance matrix and a state transition matrix;
   based on the mean vector, the initial states, probabilities of each frame of the initial subset of frames belonging to an initial state, the covariance matrix and/or the state transition matrix, ascertaining a sequence of the initial states which has maximum likelihood in resulting in the initial subset of the frames; and
   assigning the sequence of the initial states to the initial subset of the frames.

5. The method of claim 4, wherein for each subsequent subset of the frames, which represent each subsequent rotation cycle of the rotating component, ascertaining the subsequent HMM chain, including the plurality of subsequent states located on equal curve length of the second subsequent closed curve as spatial feature includes
   ascertaining, for each subsequent state, an optimal mean vector which maximises the likelihood of each frame of the subsequent subset of the frames;
   ascertaining, for each subsequent state, a difference between the optimal mean vector and the mean vector and smoothing the difference;
   ascertaining, for each subsequent state, an updated mean vector by summing the mean vector with the smoothed difference; and
   assigning the subsequent states to the subsequent subset of the frames.

6. The method of claim 5, wherein ascertaining the subsequent states based on the updated mean vector of each of the subsequent subset of the frames includes
   performing curve-fitting of the subsequent states to obtain the subsequent closed curve;
   sampling the subsequent states based on their locations on equal curve length of the subsequent closed curve; and
   based on a total length of the second closed curve, ascertaining, for each of the second states, an updated covariance matrix.

7. The method of claim 4, wherein the state transition matrix is based on Gaussian distribution.

8. The method of claim 1, wherein ascertaining the count of the rotating component in the frames includes
   summing a shortest distance travelled from a selected state of the initial HMM chain to another state of the subsequent HMM chain and dividing the sum by a total number of states in the initial HMM model or the subsequent HMM model.

9. A system for visual inspection of rotating components, the system comprising:
   a memory device storing a plurality of observed image frames; and
   a computing processor communicably coupled to the memory device and configured to:
      based on an initial subset of the frames, which represents an initial rotation cycle of a rotating component, ascertain an initial closed curve as spatial features to represent the initial rotation cycle;
      ascertain an initial Hidden Markov Model (HMM) chain, including a plurality of initial states located on equal curve length of the initial closed curve, for the initial set of the frames;
      for each subsequent subset of the frames, which represent each subsequent rotation cycle of the rotating component, ascertain a subsequent HMM chain, including a plurality of subsequent states located on equal curve length of a subsequent closed curve in spatial feature space, which represents the subsequent rotation cycle of the rotating component; and based on the initial HMM chain and the subsequent HMM chain of each subsequent subset of the frames, ascertain a count of the rotating component in the frames, and/or labelling the frames with the initial states or the subsequent states.

10. The system of claim 9, wherein the computing processor is further configured to: obtain the observed image frames from video data, by performing down-sampling, Gaussian smoothing, and principal component analysis on the video data.

11. The system of claim 9, wherein the computing processor is further configured to:

perform curve-fitting of a plurality of data points representing the initial subset of the frames; and sample the initial states based on locations of the data points at equal curve length on the initial closed curve.

12. The system of claim 9, wherein the computing processor is further configured to:

ascertain, for each of the initial states, a mean vector, a covariance matrix and a state transition matrix;

based on the mean vector, the initial states, probabilities of each frame of the initial subset of frames belonging to one of the initial states, the covariance matrix and/or the state transition matrix, ascertain a sequence of the initial states which has maximum likelihood in resulting in the initial subset of the frames; and assign the sequence of the initial states to the initial subset of the frames.

13. The system of claim 12, wherein the computing processor is further configured to: ascertain, for each subsequent state, an optimal mean vector which maximises the likelihood of each frame of the subsequent subset of the frames;

ascertain, for each subsequent state, a difference between the optimal mean vector and the mean vector and smoothing the difference;

ascertain, for each subsequent state, an updated mean vector by summing the mean vector with the smoothed difference; and assign the subsequent states to the subsequent subset of the frames.

14. The system of claim 13, wherein the computing processor is further configured to:

perform curve-fitting of the subsequent states to obtain the subsequent closed curve;

sample the subsequent states based on their locations on equal curve length of the subsequent closed curve; and based on a total length of the second closed curve, ascertain, for each of the second states, an updated covariance matrix.

15. The system of claim 12, wherein the state transition matrix is based on Gaussian distribution.

16. The system of claim 9, further comprising a display device communicably coupled to the computing processor, the display device configured to present the frames being labelled with the initial states or the subsequent states.

17. The system of claim 9, wherein the computing processor is further configured to:

ascertain the count of the rotating component in the frames by summing a shortest distance travelled from a selected state of the initial HMM chain to another state of the subsequent HMM chain and dividing the sum by a total number of states in the initial HMM model or the subsequent HMM model.

18. A non-transitory computer-readable medium having computer-readable code executable by at least one computing processor to perform the method according to claim 1.

* * * * *